United States Patent
Miguez Charines et al.

(10) Patent No.: US 9,637,214 B2
(45) Date of Patent: May 2, 2017

(54) MANUFACTURING METHOD FOR A STIFFENER ELEMENT

(71) Applicant: Airbus Operations, S.L., Madrid (ES)

(72) Inventors: Yolanda Miguez Charines, Madrid (ES); Juan Carlos Ovejero Sànchez, Getafe (ES); Eva Belén Morillo Sànchez, Getafe (ES)

(73) Assignee: AIRBUS OPERATIONS S.L., Madrid (ES)

( * ) Notice: Subject to any disclaimer, the term of this patent is extended or adjusted under 35 U.S.C. 154(b) by 193 days.

(21) Appl. No.: 14/584,857

(22) Filed: Dec. 29, 2014

(65) Prior Publication Data
US 2015/0183503 A1    Jul. 2, 2015

(30) Foreign Application Priority Data
Dec. 27, 2013   (EP) ..................... 13382565

(51) Int. Cl.
| | | |
|---|---|---|
| B29C 70/34 | (2006.01) | |
| B64C 1/06 | (2006.01) | |
| B29C 70/44 | (2006.01) | |
| B29D 99/00 | (2010.01) | |
| B64C 3/18 | (2006.01) | |
| B64C 1/00 | (2006.01) | |
| B29L 31/30 | (2006.01) | |

(52) U.S. Cl.
CPC ............ *B64C 1/064* (2013.01); *B29C 70/34* (2013.01); *B29C 70/44* (2013.01); *B29C 70/446* (2013.01); *B29D 99/0014* (2013.01); *B64C 3/182* (2013.01); *B29L 2031/3076* (2013.01); *B64C 2001/0072* (2013.01); *Y02T 50/433* (2013.01); *Y10T 156/1002* (2015.01)

(58) Field of Classification Search
None
See application file for complete search history.

(56) References Cited

U.S. PATENT DOCUMENTS

| | | |
|---|---|---|
| 2009/0317587 A1 | 12/2009 | Deobald et al. |
| 2010/0170985 A1 | 7/2010 | Flood |
| 2011/0229333 A1 | 9/2011 | Flach |
| 2015/0174831 A1* | 6/2015 | M guez Charines ............ B29D 99/0003 428/121 |

OTHER PUBLICATIONS

European Search Report for Application No. 13 38 2565.3 dated May 28, 2014.

* cited by examiner

*Primary Examiner* — Barbara J Musser
(74) *Attorney, Agent, or Firm* — Jenkins, Wilson, Taylor & Hunt, P.A.

(57) ABSTRACT

A manufacturing method is disclosed for manufacturing of a composite stiffening element, including: arranging composite laminates partially between caul plates and mold halves, and partially between a movable upper sandwich plate and a movable lower sandwich plate, moving the upper and lower sandwich plates together and moving the assembly formed by the first caul plate and the first mold half and the assembly formed by the second caul plate and the second mold half, and joining and co-curing the composite laminates to make up the composite stiffening element. A composite stiffening element is also disclosed.

6 Claims, 2 Drawing Sheets

MANUFACTURING METHOD FOR A STIFFENER ELEMENT

CROSS-REFERENCE TO RELATED APPLICATION

This application claims priority to European Patent Application No. 13382565.3 filed on Dec. 27, 2013, the entire content of which is incorporated by reference herein.

TECHNICAL FIELD

The subject matter disclosed herein belongs to the field of aircraft structures and, more particularly, to the field of stringers and stiffener elements for aeronautic structures.

BACKGROUND

Although it is a changing trend, current composite manufacturing processes are still far away from the experience and reliability of metallic parts manufacturing processes. When some new structure is invented, it is not always an easy thing to apply the knowledge of metallic manufacturing to composite manufacturing. New methods are continuously being developed to make possible and improve the manufacturing of new pieces or existing ones.

At the same time, new configurations and new solutions are being designed to face some known problems, e.g., stiffening aeronautic structures. These stiffeners are usually beams defined by their cross section. When choosing the cross section, it is important to take into account several features of the cross section, such as weight, moment of inertia and crippling behavior. Choosing a Y cross section is a good option to face these problems, but the manufacturing of stiffening elements with such a cross section presents its own drawbacks. The complex geometry and the multiple angular points, together with the closed space formed by the diagonal portions of the Y and the element to be stiffened makes it impossible to use the manufacturing methods described in the state of art for other geometries.

Because of that, new and/or alternative methods must be developed, to achieve solid pieces but allowing enough degrees of freedom so that the piece is suitable for a particular aim.

SUMMARY

The subject matter disclosed herein provides an alternative solution for the aforementioned problems, by a manufacturing method and a stiffening element according to the disclosure herein.

In a first inventive aspect, the subject matter disclosed herein provides a manufacturing method suitable for the manufacturing of a composite stiffening element, the method comprising:

a) arranging a first composite laminate with one portion placed between a first caul plate and a first mold half, and a second composite laminate with one portion placed between a second caul plate and a second mold half, such that a portion of the rest of the first composite laminate that is not placed between the first caul plate and the first mold half and a portion of the rest of the second composite laminate that is not placed between the second caul plate and the second mold half are both placed between a movable upper sandwich plate and a movable lower sandwich plate, b) moving the upper and lower sandwich plates together in a direction which is orthogonal to the plane defined by the original situation of the composite laminates causing the first and second composite laminates to be laid on the first and second mold half respectively, such that the first and second composite laminates adapt themselves to the shape of the surface of the mold half on which each composite laminate is laid, so that two angles are formed on each composite laminate, c) while the upper and lower sandwich plates move, moving the assembly formed by the first caul plate and the first mold half and the assembly formed by the second caul plate and the second mold half in a direction which is orthogonal to the movement of the sandwich plates until the entirety of the first and second composite laminates are in contact with the first and second mold half, respectively, and d) joining and co-curing the composite laminates to make up the composite stiffening element, using a vacuum bag to help maintaining the shape in the zone between the first intermediate portion and the second intermediate portion.

The fact that two portions are "joined" must be understood in the broad sense, not only as two different pieces that are attached by fastening, but also as that both portions belong to the same piece, with no discontinuities between the portions.

In one embodiment, the composite laminates making up the composite stiffening element are cured together with a piece of an aircraft structure intended to be stiffened by the composite stiffening element.

In one embodiment, the step d) of joining and co-curing is carried out in a different instrument than the one used in the rest of steps disclosed above.

In one embodiment, a solid core is used instead of the vacuum bag.

In a second inventive aspect, the subject matter disclosed herein provides a composite stiffening element manufactured by a method as described herein, for stiffening a piece of an aeronautic structure, the stiffening element comprising:
 a first foot and a second foot, both feet intended to be in contact with the piece of an aeronautic structure,
 a first intermediate portion and a second intermediate portion, and
 a web,
wherein
 the first intermediate portion is joined to the first foot by a first edge and is joined to the second intermediate portion and to the web by a second edge, being the second edge substantially opposed to the first edge,
 the second intermediate portion is joined to the second foot by a first edge and is joined to the first intermediate portion and to the web by a second edge, being the second side substantially opposed to the first edge,
 the web is free in a first edge and is joined to the first intermediate portion and to the second intermediate portion by a second edge,
so that
 the first intermediate portion and the second intermediate portion form a web angle, which is less than 180°,
 the first intermediate portion and the first foot form a first foot angle, which is less than 180°,
 the second intermediate portion and the second foot form a second foot angle, which is less than 180°,
 the sum of the first foot angle plus the second foot angle minus the web angle equals to 180°, wherein
the web angle is between 50° and 70°.

In one embodiment, the web angle is between 60° and 65°.

In one embodiment, the first foot angle and the second foot angle are between 120° and 165°.

In one embodiment, the cross section of the composite stiffening element in a point of its length is different from the cross section of the composite stiffening element in another point of its length.

In one embodiment, the first foot and the second foot are not in the same plane and are therefore in different planes.

In one embodiment, the thickness of the first intermediate portion and the thickness of the second intermediate portion are different.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the subject matter disclosed herein will become clearly understood in view of the detailed description of the subject matter disclosed herein which becomes apparent from the subject matter disclosed herein, given just as an example and not being limited thereto, with reference to the drawings.

DETAILED DESCRIPTION

Figure 1A:
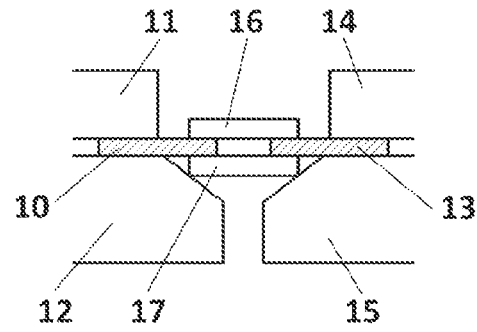
FIGS. 1a to 1d illustrate steps of a method of manufacturing stiffening elements according to the subject matter disclosed herein.
Figure 1B:
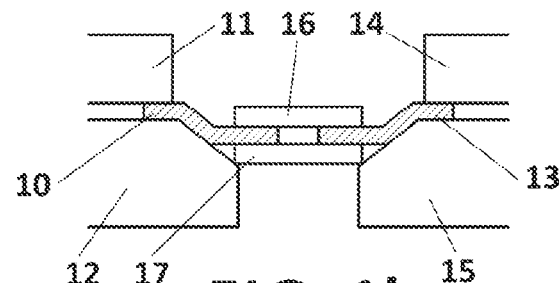

The subject matter disclosed herein provides a manufacturing method to manufacture stiffening elements (1). One embodiment of this method is illustrated by FIGS. 1a to 1d. In this embodiment, a first part of the method comprises:

a) [FIG. 1a] arranging a first composite laminate (10) with one portion placed between a first caul plate (11) and a first mold half (12), and a second composite laminate (13) with one portion placed between a second caul plate (14) and a second mold half (15), such that a portion of the rest of the first composite laminate (10) that is not placed between the first caul plate (11) and the first mold half (12) and a portion of the rest of the second composite laminate (13) that is not placed between the second caul plate (14) and the second mold half (15) are placed between a movable upper sandwich plate (16) and a movable lower sandwich plate (17), b) [FIG. 1b] moving the upper and lower sandwich plates (16, 17) together in a direction which is orthogonal to the plane defined by the original situation of the composite laminates (10, 13), causing the first and second composite laminates (10, 13) to be laid on the first and second mold half (12, 15) respectively, such that the first and second composite laminates (10, 13) adapt themselves to the shape of the surface of the mold half (12, 15) on which each composite laminate is laid, so that two angles are formed on each composite laminate (12, 15), c) [FIG. 1b] while the sandwich plates (16, 17) move, the assembly formed by the first caul plate (11) and the first mold half (12) and the assembly formed by the second caul plate (14) and the second mold half (15) moves away in a direction which is orthogonal to the movement of the sandwich plates (16, 17) until the entirety of the first and second composite laminates (10, 13) are in contact with the first and second mold half (12, 15), respectively.

Figure 1C:
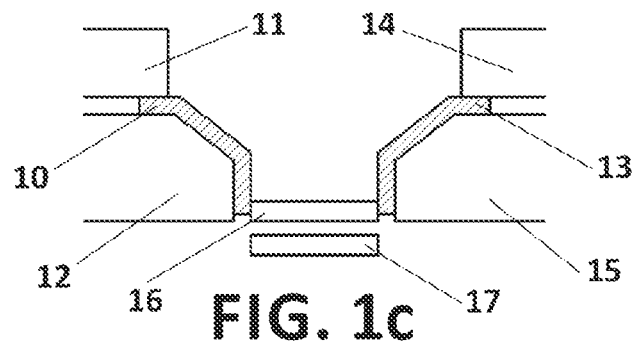

FIG. 1c shows the final result of this first part of the method, when the two composite laminates (10, 13) are shaped like the two halves of a Y stiffening element.

Figure 1D:
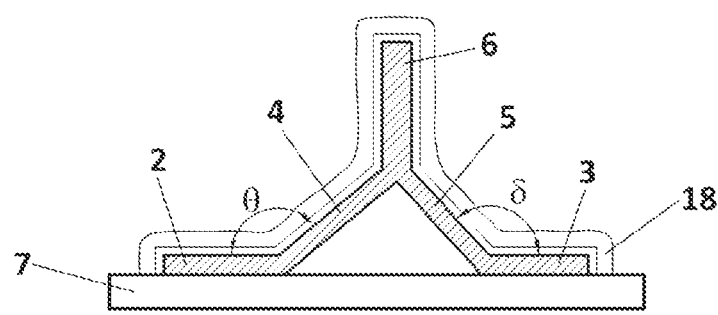

This method allows obtaining two stiffening element halves. In a further step of the method, it comprises another step:

d) [FIG. 1d] these two composite laminates (10, 13) are joined and cured together. The cure process includes using a vacuum bag (18) placed in the inner part of the triangle formed by the intermediate portions (4, 5).

In one embodiment, the two composite laminates (10, 13) are co-cured with the portion of the aeronautic structure (7) to be stiffened, so that the vacuum bag (18) is placed in the inner part of the triangle formed by the intermediate portions and the surface to be stiffened.

In another embodiment of the method, the vacuum bag (18) is replaced by a solid core.

Foot angles (θ, δ) are conditioned by constructional limits. If they are very close to 90° or to 180°, the vacuum bag (18) is quite difficultly adapted to the triangle formed by both intermediate portions (4, 5) and the surface of the piece of an aeronautic structure to be stiffened (7).

Advantageously, this method allows the manufacturing of isolated individual stiffening elements (1), and controlling the thicknesses of the different parts of the stiffening element (1).

In one embodiment, the step d) of joining and co-curing is carried out in a different instrument than the one used in the rest of steps. Advantageously, it allows that the forming of some composite laminates can be carried out at the same time that the co-curing of other already formed composite laminates.

Figure 2A:
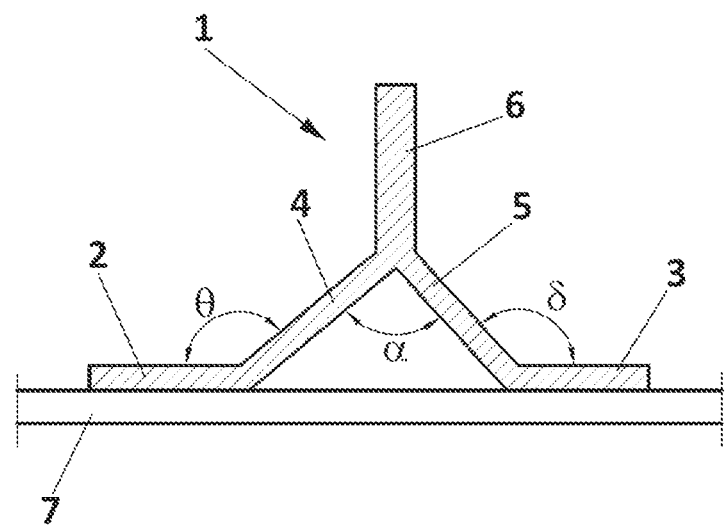
FIGS. 2a to 2b illustrate cross sections of a stiffening element according to the subject matter disclosed herein and of a stiffening element known in the state of the art.
Figure 2B:
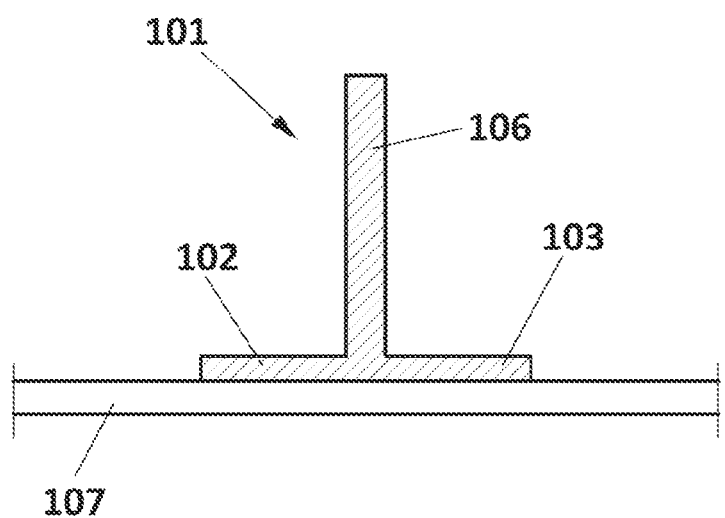

FIG. 2a shows a cross section of a stiffening element (1) according to the subject matter disclosed herein. It is compared to a T section stiffening element (101), shown in FIG. 2b.

In this FIG. 2a, the main parts of the cross section of the stiffening element (1) according to the subject matter disclosed herein are identified. The feet (2, 3) are similar to those found in the T section stiffening element (101). The rest of the stiffening element (1), which in other cross sections would correspond to the web (106), has two parts: the web (6) itself and the first and second intermediate portions (4, 5). In FIG. 1b, both web (102) and feet (102, 103) are identified in the T section stiffening element (101), but this one does not have any intermediate portions, but it only has a web (106) and feet (102, 103), the feet (102, 103) resting on the piece to be stiffened (107).

The feet (2, 3) of the stiffening element (1) according to the subject matter disclosed herein shown in FIG. 1a, as seen in the cross section, are the same as in other stiffening elements, i.e., two portions that rest on the surface of the piece to be stiffened (7). The web (6), as seen in the cross section, is also almost the same as in other stiffening elements, i.e., a portion which is usually orthogonal to the feet (2, 3) and provides rigidity to the piece to be stiffened (7). But in the case of the stiffener element (1) of the subject matter disclosed herein, the web (6) does not reach the feet (2, 3) directly, as usual, but reaches first and second intermediate portions (4, 5). These intermediate portions (4, 5)

are two portions that both merge from one edge of the web (6), and each one rests on one of the feet (2, 3). In summary, the stiffening element (1) comprises a web (6), a first and a second intermediate portions (4, 5) and two feet (2, 3): from one edge of the web (6), first and second intermediate portions (4, 5) merge, and one edge of each intermediate portion (4, 5) rests on one foot (2, 3). In other words, a first edge of each intermediate portion (4, 5) are joined to the same edge of the web (6), the second edge of the first intermediate portion (4) is attached to an edge of the first foot (2), and the second edge of the second intermediate portion (5) is attached to an edge of the second foot (3).

The first intermediate portion (4) and the second intermediate portion (5) form an interior angle less than 180° called web angle ($\alpha$). The first intermediate portion (4) and the first foot (2) form an interior angle less than 180° called first foot angle ($\theta$). The second intermediate portion (5) and the second foot (3) form an interior angle less than 180° called second foot angle ($\delta$). In one embodiment, the first foot angle ($\theta$) is different from the second foot angle ($\delta$), causing the first foot (2) and the second foot (3) to not be in the same plane and be in different planes. In one embodiment, the first foot angle ($\theta$) and the second foot angle ($\delta$) are between 120° and 165°.

In one embodiment, the cross section of the composite stiffening element (1) in a point of its length is different from the cross section of the composite stiffening element (1) in another point of its length.

The cross section of this configuration can thus be seen as a Y adding two feet, each one coming from one upper tip of the Y. This Y section composite stringer is different from the T section stringers, and it has some advantages compared to this latter.

Performance of this stiffening element (1) is determined by the thickness of the web (6) the intermediate portions (4, 5) and the feet (2, 3), by the total height of the stiffening element (1), and by the web angle ($\alpha$), the first foot angle ($\theta$) and the second foot angle ($\delta$).

In one embodiment, the thickness of the web (6) is between 5 mm and 20 mm, the thickness of the intermediate portions (4, 5) is between 3 mm and 15 mm and the thickness of the feet (2, 3) is between 3 mm and 15 mm. In one embodiment, the thickness of the first intermediate portion (4) and the thickness of the second intermediate portion (5) are different.

In one embodiment, the height of the web (6) is between 30 mm and 100 mm. The ratio between the height of the web (6) and the height of the first intermediate portion (4) is between 0.5 and 1.5. The ratio between the height of the web (6) and the height of the second intermediate portion (5) is between 0.5 and 1.5. The ratio between the height of the web and the height of the first foot (2) is between 0.5 and 1.5. The ratio between the height of the web and the height of the second foot (3) is between 0.5 and 1.5.

This configuration makes that this stiffening element cross section have a better performance under flexion and crippling, and turns out to be lighter than a T section of the same moment of inertia.

For example, given a T section stringer cross section 90 mm wide, 90 mm high and 10 mm thick, the inertia moments are $lx=1.109e-5$ and $ly=3.108e-6$. The cross section area is 1300 mm$^2$.

Provided a stiffening element (1) according to the subject matter disclosed herein, with a cross section being 90 mm high, 110 mm wide and 10 mm thick, with a web angle of 60°, the inertia moments are $lx=1.04e-5$ and $ly=5.91e-06$. The cross section area is 1261 mm$^2$. If the web angle is 65°, the inertia moments are $lx=1.034e-6$ and $ly=6.04e-06$. The cross section area is 1251 mm$^2$. For a 30 m long stringer, provided the composite density as 1750 kg/m$^3$, the first T section stringer would be 68.25 kg, the 60° stiffening element (1) of the subject matter disclosed herein would be 66.2 kg and the 65° stiffening element (1) of the subject matter disclosed herein would be 65.67 kg. Thus, these two values of the web angle ($\alpha$) would offer a better behavior than the stiffening elements known in state of art.

As far as foot angles ($\theta$, $\delta$) are concerned, in one embodiment, the first foot angle ($\theta$) is different from the second foot angle ($\delta$). Because of the shape, these foot angles ($\theta$,$\delta$) are between 90°-$\theta$ and $\delta$ equal to 90° would make the Y cross section of the stiffening element (1) become a narrow T, as the intermediate portions (4, 5) would become part of the web- and 180°-$\theta$ and $\delta$equal to 180° would make the Y become a wide T, as each intermediate portion would become part of their respective foot. In one embodiment, these foot angles ($\theta$, $\delta$) are between 110° and 130°. If the angles are nearer to 90° than to 180°, the Y shape of the cross section of the stiffening element (1) is more slender. If the angles are nearer to 180° than to 90°, the Y shape of the cross section of the stiffening element (1) is flatter.

The invention claimed is:

1. A manufacturing method for manufacturing a composite stiffening element, the method comprising:
    a) arranging a first composite laminate with one portion placed between a first caul plate and a first mold half, and a second composite laminate with one portion placed between a second caul plate and a second mold half, such that a portion of a remainder of the first composite laminate that is not placed between the first caul plate and the first mold half and a portion of a remainder of the second composite laminate that is not placed between the second caul plate and the second mold half are both placed between a movable upper sandwich plate and a movable lower sandwich plate,
    b) moving the upper and lower sandwich plates together in a direction which is orthogonal to the plane defined by the original situation of the composite laminates, causing the first and second composite laminates to be laid on the first and second mold half respectively, such that the first and second composite laminates adapt themselves to a shape of the surface of the mold half on which each composite laminate is laid, so that two angles are formed on each composite laminate, wherein the two angles formed on each of the first and second composite laminates define an intermediate portion on each of the first and second composite laminates thereby providing a first intermediate portion on the first composite laminate and a second intermediate portion on the second composite laminate,
    c) while the upper and lower sandwich plates move, moving the assembly formed by the first caul plate and the first mold half and the assembly formed by the second caul plate and the second mold half in a direction orthogonal to the movement of the sandwich plates until an entirety of the first and second composite laminates is in contact with the first and second mold half, respectively, and
    d) joining and co-curing the composite laminates to make up the composite stiffening element, using a vacuum bag to help maintain shape in a zone between the first intermediate portion and the second intermediate portion.

2. The manufacturing method according to claim 1, wherein the composite laminates making up the composite stiffening element are cured together with a piece of an aircraft structure intended to be stiffened by the composite stiffening element.

3. The manufacturing method according to claim 1, wherein joining and co-curing is carried out in a different instrument than one used in others steps of claim 1.

4. A manufacturing method for manufacturing a composite stiffening element, the method comprising:
   a) arranging a first composite laminate with one portion placed between a first caul plate and a first mold half, and a second composite laminate with one portion placed between a second caul plate and a second mold half, such that a portion of a remainder of the first composite laminate that is not placed between the first caul late and the first mold half and a portion of a remainder of the second composite laminate that is not placed between the second caul plate and the second mold half are both placed between a movable upper sandwich plate and a movable lower sandwich plate,
   b) moving the upper and lower sandwich plates together in a direction which is orthogonal to the plane defined by the original situation of the composite laminates, causing the first and second composite laminates to be laid on the first and second mold half respectively such that the first and second composite laminates adapt themselves to a shape of the surface of the mold half on which each composite laminate is laid so that two angles are formed on each composite laminate, wherein the two angles formed on each of the first and second composite laminates define an intermediate portion on each of the first and second composite laminates and thereby providing a first intermediate portion on the first composite laminate and a second intermediate portion on the second composite laminate,
   c) while the upper and lower sandwich plates move, moving the assembly formed by the first caul plate and the first mold half and the assembly formed by the second caul plate and the second mold half in a direction orthogonal to the movement of the sandwich plates until an entirety of the first and second composite laminates is in contact with the first and second mold half, respectively, and
   d) joining and co-curing the composite laminates to make up the composite stiffening element, using a solid core to help maintain shape in a zone between the first intermediate portion and the second intermediate portion.

5. The manufacturing method according to claim 4, wherein the composite laminates making up the composite stiffening element are cured together with a piece of an aircraft structure intended to be stiffened by the composite stiffening element.

6. The manufacturing method according to claim 4, wherein joining and co-curing is carried out in a different instrument than one used in others steps of claim 4.

\* \* \* \* \*